(12) United States Patent
Davis

(10) Patent No.: US 8,326,231 B1
(45) Date of Patent: Dec. 4, 2012

(54) PRESERVING CELL PHONE BATTERY LIFE

(75) Inventor: Benjamin Davis, San Francisco, CA (US)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 13/364,763

(22) Filed: Feb. 2, 2012

(51) Int. Cl.
*H04B 17/00* (2006.01)

(52) U.S. Cl. .............. 455/67.11; 455/41.2; 455/574; 455/556.2; 455/566; 455/557; 455/575.1; 370/338; 370/311; 370/312; 370/908

(58) Field of Classification Search ............ 455/67.11, 455/41.2, 574, 566, 556.2, 557, 575.1; 370/338, 370/311–312, 901, 908
See application file for complete search history.

(56) References Cited

U.S. PATENT DOCUMENTS

| | | | |
|---|---|---|---|
| 6,463,307 B1 | 10/2002 | Larsson et al. | |
| 7,542,753 B2 * | 6/2009 | Stepanian | 455/344 |
| 7,797,431 B2 * | 9/2010 | Franklin et al. | 709/227 |
| 7,937,109 B2 * | 5/2011 | Wilson | 455/557 |
| 7,983,646 B2 * | 7/2011 | Boireau et al. | 455/296 |
| 2008/0155006 A1 * | 6/2008 | Franklin et al. | 709/200 |
| 2010/0058087 A1 * | 3/2010 | Borras et al. | 713/322 |
| 2010/0284316 A1 | 11/2010 | Sampathkumar | |
| 2011/0038292 A1 | 2/2011 | Salomone et al. | |
| 2011/0269506 A1 * | 11/2011 | Choi et al. | 455/566 |

FOREIGN PATENT DOCUMENTS

| | | |
|---|---|---|
| WO | 2010078206 A2 | 7/2010 |
| WO | 2011063516 A1 | 6/2011 |

* cited by examiner

*Primary Examiner* — Marceau Milord
(74) *Attorney, Agent, or Firm* — Fox Rothschild LLP

(57) ABSTRACT

A method of operating a mobile electronic device includes connecting, by an electronic device, to a network and transmitting, by the electronic device, at least one communication to the network. The method also includes identifying, by a processor of the electronic device, at least one communication parameter of the at least one communication and determining, by the processor of the electronic device, a first disconnect time as which to disconnect from the network based on the at least one communication parameter identified by the processor. The method further includes disconnecting from the network at the first disconnect time.

18 Claims, 7 Drawing Sheets

PRESERVING CELL PHONE BATTERY LIFE

BACKGROUND

Daily use of mobile communication devices, such as cell phones, has dramatically increased over past decades. It has become more difficult for users to maintain mobile device power in between charges due to this increased use, limitations in battery technology and the inability to access electricity for periods of time.

Typically, mobile devices remain continually connected to the network to check for incoming data. A large percentage of the time, however, a mobile device is not actively used to exchange communications, such as phone calls, e-mails and messaging. The continued network connection contributes to a large power consumption of the mobile device compared to the limited amount of time the mobile device is actively being used during the continued network connection. Some mobile devices offer a power-saving mode (i.e. airplane mode), during which time the device remains disconnected from the network. Users may also choose to turn the devices off to preserve power. But in both the power-saving mode and the power off state, users cannot receive or send any communication.

This document describes methods and systems that are directed to solving at least some of the problems described above.

SUMMARY

In an embodiment, a method of operating a mobile electronic device includes connecting, by an electronic device, to a network and transmitting, by the electronic device, at least one communication to the network. The method also includes identifying, by a processor of the electronic device, at least one communication parameter of the at least one communication and determining, by the processor of the electronic device, a first disconnect time as which to disconnect from the network based on the at least one communication parameter identified by the processor. The method further includes disconnecting from the network at the first disconnect time.

In some embodiments, the method also includes detecting, by the processor of the electronic device, an instruction received at a user interface of the electronic device. The determining, by the processor of the electronic device, when to disconnect from the network is based on the received instruction at the user interface.

In some embodiments, identifying at least one communication parameter includes identifying a time when the at least one communication was transmitted to the network, and the method also includes receiving an instruction to disconnect from the network when an amount of time has elapsed from the time when the at least one communication was transmitted to the network. Determining when to disconnect from the network includes determining when to disconnect from the network based on the amount of time that has elapsed from the time when the at least one communication was transmitted to the network.

In some embodiments, identifying at least one communication parameter includes identifying a type of communication and determining when to disconnect from the network includes determining when to disconnect from the network based on the type of communication.

In some embodiments, the type of communication is selected from a group of communication types consisting of voice transmissions, text messages, multi-media messages and e-mails.

In some embodiments, identifying at least one communication parameter includes identifying an alphanumeric communication parameter from a group of alphanumeric communication parameters which include at least one alphanumeric character, a combination of alphanumeric characters, a number of occurrences of the alphanumeric character included in the at least one communication and the number of occurrences of the combination of alphanumeric characters included in the at least one communication. Determining when to disconnect from the network includes determining when to disconnect from the network based on the least one alphanumeric character of the at least one communication.

In some embodiments, identifying at least one communication parameter includes identifying a destination of the at least one communication and determining when to disconnect from the network includes determining when to disconnect from the network based on the destination of the at least one communication.

In some embodiments, the at least at least one communication includes a first communication and a second communication. Identifying at least one communication parameter includes identifying communication parameters of the first communication as a time that the first communication was transmitted and a destination of the first communication. Identifying at least one communication parameter also includes communication parameters of the second communication as a time that the second communication was transmitted and the destination of the first communication. Determining when to disconnect from the network is based on an amount of time between the time that the first communication was sent to the destination and the time that the second communication was sent to the destination.

In some embodiments, the method includes determining, by the processor, when to reconnect to the network after disconnecting from the network based on the at least one communication parameter of the at least one communication.

In an embodiment, a method of operating a mobile electronic device includes connecting, by an electronic device, to a network and transmitting, by the electronic device, a first communication to the network. The method also includes identifying, by a processor of the electronic device, at least one communication parameter of the first communication and determining, by the processor of the electronic device, a second transmitting time for transmitting a second communication to the network based on at least one communication parameter identified by the processor. The method also includes disconnecting, by the electronic device, from the network and determining, by the processor of the electronic device, a reconnecting time for reconnecting to the network based on the second transmitting time determined by the processor of the electronic device. The method further includes reconnecting, by the electronic device, to the network at the determined reconnecting time and transmitting the second communication to the network at the second transmission time, the second transmission time occurring within a predetermined allowance time period from the determined reconnecting time.

In some embodiments, the method includes detecting, by the processor of the electronic device, an instruction received at a user interface of the electronic device. Determining, by the processor of the electronic device, a second transmitting time for transmitting a second communication to the network includes determining a second transmission time based on the received instruction at the user interface.

In some embodiments, identifying at least one communication parameter includes identifying a time when the first communication was transmitted to the network. Determining a second transmitting time for transmitting a second communication to the network includes determining a second transmitting time based on the time when the first communication was transmitted to the network and a predetermined call back time period. The predetermined call back time period corresponds to a predetermined period of time that elapses from the time when the first communication was transmitted to the network.

In some embodiments, the method includes receiving, by the other electronic device, the first communication from the electronic device and connecting, by another electronic device, to the network. The method also includes identifying the at least one communication parameter of the first communication as the time when the first communication was transmitted to the network, determining, by a processor of the other electronic device, the second transmitting time of the second communication based on the time when the first communication was transmitted and the predetermined call back time period and determining, by the processor of the other electronic device, a reconnecting time for reconnecting to the network based on the second transmitting time determined by the processor of the other electronic device. The method further includes displaying, at a display of the other electronic device, the second transmitting time, disconnecting, by the other electronic device, from the network and reconnecting, by the other electronic device, to the network at the determined reconnecting time.

In some embodiments, the method also includes storing, at the electronic device and the other electronic device, the predetermined call back time period. Determining the second transmitting time by the processor of the electronic device includes determining the second transmitting time based on the time when the first communication was transmitted to the network and the stored predetermined call back time period. Determining the second transmitting time by the processor of the other electronic device includes determining the second transmitting time based on the time when the first communication was transmitted to the network and the stored predetermined call back time period.

In an embodiment, a mobile electronic device operation system includes an electronic device that includes a transmitter configured to transmit at least one communication to a network, a user interface configured to receive user instructions from a user of the electronic device and a computing device having a processor and a memory. The memory has at least one of the user instructions and preset instructions that instruct the processor to identify at least one communication parameter of the at least one communication and determine a first disconnect time as which to disconnect from the network based on the at least one communication parameter identified by the processor and disconnect from the network at the first disconnect time.

In some embodiments, the at least one of the user instructions and preset instructions further instruct the processor of the electronic device to identify the at least one communication parameter as a time when the at least one communication was transmitted to the network and disconnect from the network based on an amount of time that has elapsed from the time when the at least one communication was transmitted to the network.

In some embodiments, the at least one of the user instructions and preset instructions further instruct the processor of the electronic device to reconnect to the network after disconnecting from the network based on the at least one communication parameter of the at least one communication.

In some embodiments, the at least one of the user instructions and preset instructions further instruct the processor of the electronic device to identify the at least one communication parameter as a time when a first communication of the at least one communication was transmitted to the network and determine a second transmitting time for transmitting a second communication of the at least one communications to the network based on the time when the first communication was transmitted to the network and a predetermined call back time period. The predetermined call back time period corresponds to a predetermined period of time that elapses from the time when the first communication was transmitted to the network. The at least one of the user instructions and preset instructions further instruct the processor of the electronic device to disconnect the electronic device from the network, determine a reconnecting time for reconnecting to the network based on the second transmitting time determined by the processor of the electronic device, reconnect the electronic device to the network at the determined reconnecting time and transmit the second communication to the network at the second transmission time. The second transmission time occurs within a predetermined allowance time period from the determined reconnecting time.

In some embodiments, the system also includes another electronic device that includes a receiver configured to receive at least one communication from the network and a user interface configured to receive user instructions from a user of the other electronic device. The system further includes a display configured to display messages to the user of the other electronic device and a computing device having a processor and a memory. The memory has at least one of the user instructions from the user of the other electronic device and preset instructions that instruct the processor of the other electronic device to: identify the at least one communication parameter of the first communication received from the electronic device as the time when the first communication was transmitted to the network by the electronic device; determine the second transmitting time of the second communication based on the time when the first communication was transmitted to the network and the predetermined call back time period; cause the display to display a message to the user of the other electronic device indicating the second transmitting time; disconnect the other electronic device from the network; and reconnect the other electronic device to the network at the second transmitting time.

In some embodiments, the predetermined call back time period is stored at the memory of the electronic device and the memory of the other electronic device. The at least one of the user instructions and preset instructions further instruct the processor of the electronic device to determine the second transmitting time based on the time when the first communication was transmitted to the network and the predetermined call back time period stored at the electronic device. The at least one of the user instructions and preset instructions further instruct the processor of the other electronic device to determine the second transmitting time based on the time when the first communication was transmitted to the network and the predetermined call back time period stored at the other electronic device.

DETAILED DESCRIPTION

As used in this document, "a network" may be a wired or wireless communications network such as a local area network, a wide area network, an intranet, the Internet or another network.

As used in this document, a statement that a device or system is "connected to a network" may mean that devices or systems are configured to transmit and receive data, commands and/or queries via a network.

As used in this document, a statement that a device or system is "in direct data communication with" another device or system may mean that devices or systems are connected to each other in a real-time state of transmitting and receiving data, commands and/or queries with each other via a network.

A "destination" may refer to any network destination of a communication, such as an e-mail address, a phone number, a physical address in a network, an Internet protocol address, and a website or web address.

A "computing device" may refer to a computer, a processor and/or any other component, device or system that performs one or more operations according to one or more programming instructions.

This disclosure is not limited to the particular systems, devices and methods described, as these may vary. Also, the terminology used in this document is only for the purpose of describing the particular versions or embodiments only, and it is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

Figure 1:
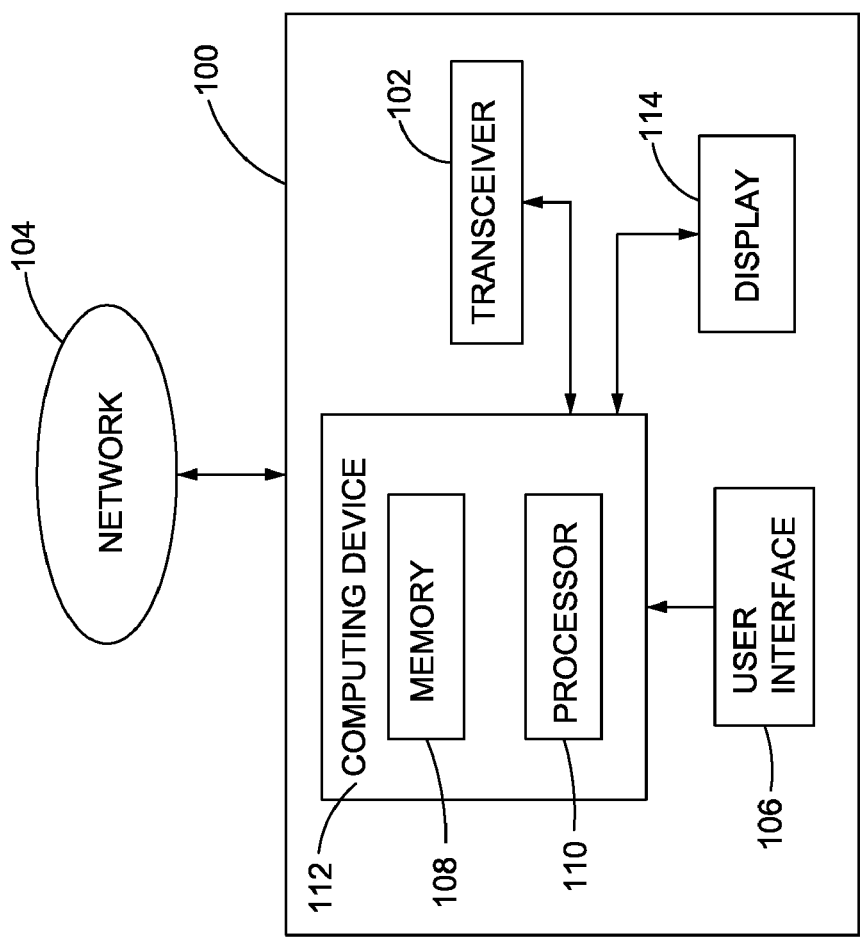
FIG. 1 illustrates an electronic device.

FIG. 1 illustrates an example of an electronic device 100. Examples of suitable electronic devices include portable devices such as mobile phones, personal digital assistants, tablet computers, e-books, portable computers and the like. The embodiments described in this document relate to electronic devices that may include a user interface. For example, the electronic device 100 may include a user interface 106 configured to receive user instructions from a user of the electronic device 100 and a display 114 configured to display information to the user. The user interface may include a touch-sensitive input component that is integrated with the display, such as a capacitive, resistive or other type of touch screen. Alternatively, the touch-sensitive component may be an item of hardware that is separate from the display, touch as a touch pad or trackpad, such as a keyboard and a mouse. The electronic device 100 may also receive inputs from other devices, such as a camera and a microphone.

The electronic device 100 also includes a transceiver 102. Transceiver 102 includes a transmitter configured to transmit at least one communication to a network 104 and a receiver for receiving communications from the network 104. Electronic devices may, however, include a transmitter that is separate from a receiver. The electronic device 100 also includes a computing device 112 having a processor 110, a tangible, computer-readable memory 108, and program instructions that implement a process of determining when to disconnect from the network 104. In some embodiments, memory 108 is configured to store at least one of the user instructions and preset instructions. Processor 110 may also receive instructions directly by the user interface 106. In other embodiments, instructions may be stored in a remote storage location such as a networked server or a cloud storage device. If the items are stored remotely, the device may retrieve them from the remote storage location via one or more communication ports. The server may include a web server, a server, a minicomputer, a mainframe computer, a personal computer, a mobile computing device, or other such device. The tangible, computer-readable memory 108 may include a collection of one or more devices, at least one having a tangible computer-readable memory that stores data in a structured format, such as one or more databases, tables, or other computer-readable files.

The embodiments described in this document may enable an electronic device to algorithmically determine when to disconnect from a network, when to connect to the network and when to transmit a communication without being in direct data communication with another electronic device. Accordingly, power may be conserved in the electronic device, while minimizing delays to the exchanging of data between electronic devices.

Figure 2:
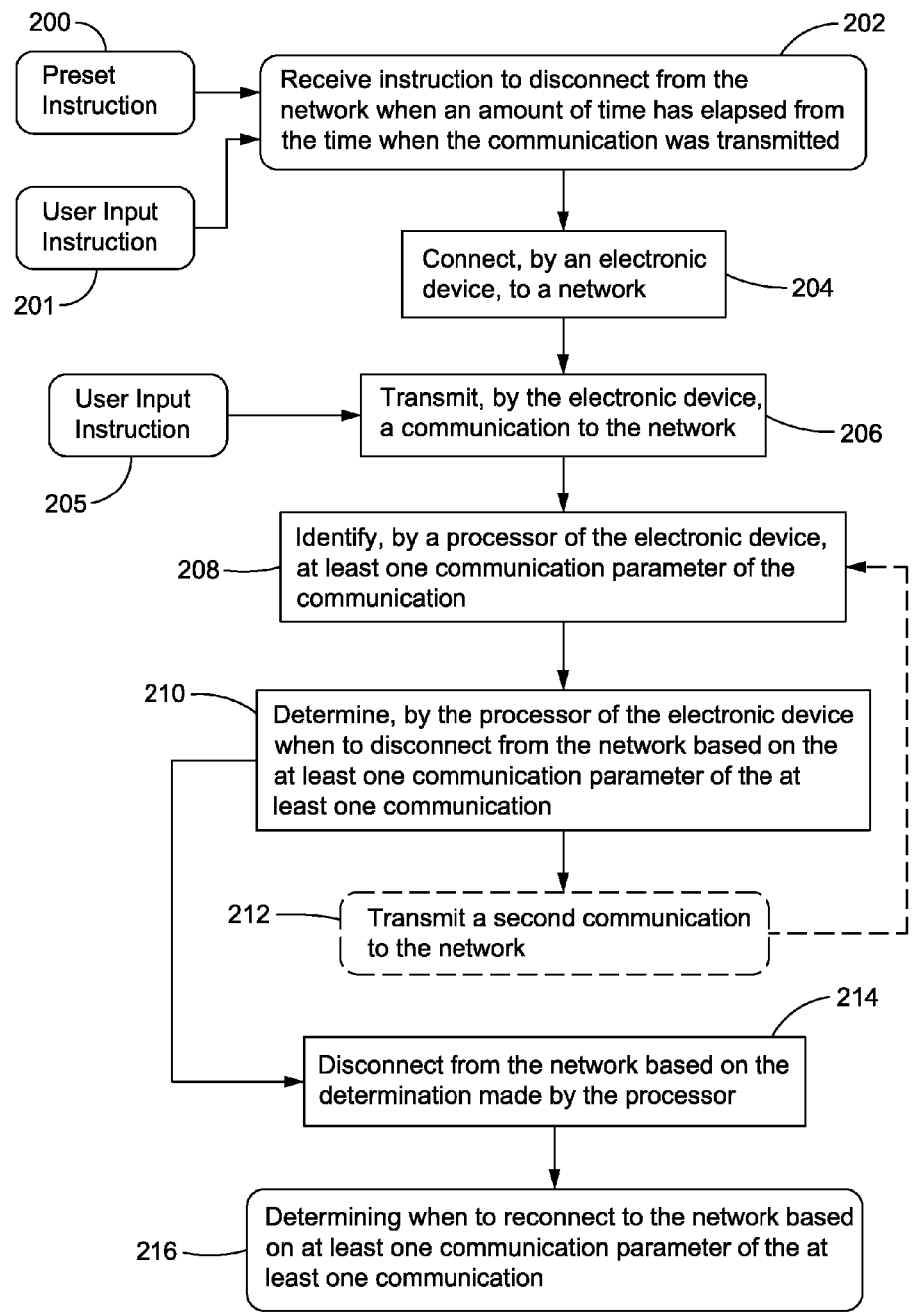
FIGS. 2 and 3 are flowcharts illustrating processes for determining when to disconnect from a network.

FIG. 2 is a flowchart illustrating a process for determining when to disconnect from a network. An electronic device may receive at least one of a pre-set instruction, shown at block 200, and a user instruction, shown at blocks 201 and 205. An instruction may be received prior to connecting to a network, as shown at blocks 200 and 201, simultaneous with the connecting to a network or after connecting to a network, as shown at block 205. The electronic device may receive at least one of a user instruction and a preset instruction to disconnect from the network when an amount of time has elapsed from the time when the communication was transmitted, as shown at block 202.

The processor may receive a single instruction for determining when to disconnect from a network. The processor may also receive multiple instructions for determining when to disconnect from a network. The multiple instructions may include any instruction shown at blocks 200, 201, 202 and 205. Each instruction may be associated with the same or a different communication parameter, such as a communication type or a destination of the communication. Each instruction may also instruct the processor to determine when to disconnect. The processor may algorithmically prioritize the received multiple instructions to determine when to disconnect. The priority itself may also be determined by a user instruction or preset instruction. The priority may be determined based on whether the instruction is a preset instruction or a user instruction. The priority may be determined based on the type of communication parameter. For example, the processor may determine to disconnect based on a destination instead of communication type. The priority may be determined based on the time the instruction was received. For example, the processor may determine to disconnect based on a user instruction received simultaneous with a communication transmission instead of a user instruction received prior to the communication transmission. The determination process by the processor is also described in more detail below with reference to FIG. 3.

The process may include connecting, by an electronic device, to a network, at block 204 and transmitting, by the electronic device, at least one communication to the network, at block 206. Communications transmitted by electronic devices described in the embodiments of this document may include different types of communications, such as voice transmissions, text messages, multi-media messages and e-mails, among other types of communication. Each communication may also include a single destination, multiple destinations corresponding to a person or entity, and multiple destinations corresponding to different people or entities. Each communication may also include an alphanumeric character, such as a letter, number or symbol and a combination of alphanumeric characters, such as a word or group of words.

The processor of the electronic device may then identify at least one communication parameter for each communication transmitted to the network, at block 208. For example, the processor may identify the at least one communication parameter as a time when the at least one communication was transmitted to the network. The processor may identify the at least one communication parameter as a type of communication, such as voice transmissions, text messages, multi-media messages and e-mails. The processor may also identify the at least one communication parameter as an alphanumeric communication parameter. Alphanumeric communication parameters may include at least one alphanumeric character (i.e. a letter or symbol), a combination of alphanumeric characters (i.e. a word or a combination of words), a number of occurrences of the alphanumeric character included in the at least one communication (i.e. a symbol or letter is repeated at least three times) and the number of occurrences of the combination of alphanumeric characters (i.e. a word or combination of words is repeated at least 3 times) included in the at least one communication. The processor may use voice recognition to identify words, groups of words and the like for each voice transmission. The processor may further identify the at least one communication parameter as a destination of the at least one communication.

The at least one communication may include a first communication transmitted by the electronic device and a second communication transmitted by the electronic device. The processor may identify a communication parameter of the first communication indicating a time the first communication was transmitted and a communication parameter indicating a destination of the first communication. If a second communication is transmitted by the electronic device to the network, shown in phantom at block 212, the processor may also identify a communication parameter of the second communication at block 208, indicating a time the second communication was transmitted and a communication parameter indicating the same destination as the destination of the first communication. When a parameter is identified by the processor of the electronic device, the processor of the electronic device may then determine when to disconnect from the network based on the at least one communication parameter identified by the processor, at block 210. When the determination to disconnect from the network is made, the electronic device may be disconnected from the network at block 214. The electronic device may be disconnected, at block 214, based on different determinations made by the processor, as described in more detail below with reference to FIG. 3.

After the electronic device is disconnected, at block 214, the processor may also receive at least one of the user instructions and preset instructions for determining when to reconnect to the network after disconnecting from the network based on the at least one communication parameter of the at least one communication, at block 216. The processor may make the determination of when to reconnect prior to, simultaneously with or after the determination of when to disconnect from the network based on the at least one communication parameter. The processor may determine when to disconnect and determine when to reconnect based on the same communication parameters. The processor may also determine when to disconnect and determine when to reconnect based on the different communication parameters.

Figure 3:
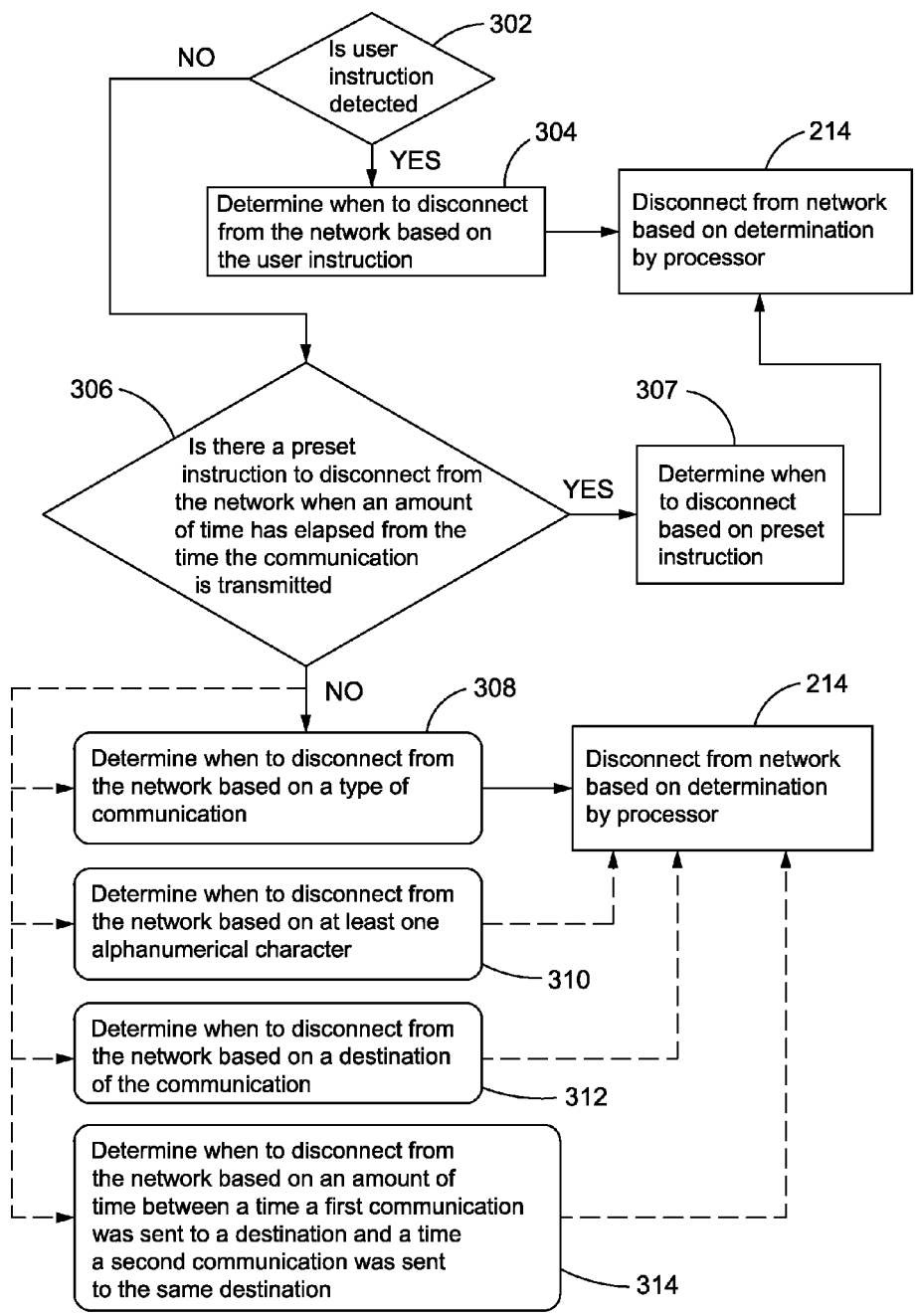

FIG. 3 is a flowchart illustrating a process for determining when to disconnect from the network. FIG. 3 illustrates one method of a processor algorithmically determining when to disconnect from a network. As described above, however, a processor may algorithmically prioritize received instructions in any order based on a number of different factors, such as: whether the instruction is a user instruction or preset instruction: a type of communication parameter; and the time the instruction was received. Accordingly, a processor may detect an instruction at different times and may determine whether to disconnect based on the detected instructions in a process different from that shown at FIG. 3. At block 302, the processor detects whether an instruction is received at a user interface of the electronic device. A user input instruction may be received by the electronic device, shown in phantom at block 201, prior to transmission of a communication to the network, at block 206. For example, if the processor identifies the at least one communication parameter as a time when the at least one communication was transmitted to the network, the electronic device may receive a user input instructing the processor to transmit a communication and disconnect from the network when an amount of time (i.e. 20 minutes) has elapsed from the time when the at least one communication was transmitted to the network, at block 202. Alternatively, a user input instruction may be received by the electronic device, shown in phantom at block 205, substantially simultaneous with transmission of a communication to the network, at block 206. For example, an electronic device may include a single user input instructing the processor to transmit a communication and disconnect from the network immediately after the communication is transmitted.

User input instructions, at blocks 201 and 205, may also include instructions based on parameters other than a time when the at least one communication was transmitted to the network. For example, the processor may also identify another communication parameter, such as a communication type, and the user input instruction may also instruct the processor to determine when to disconnect from the network based on the other communication parameter, such as the communication type. For example, the processor may identify the communication parameter as a text message, and the user input instruction may instruct the processor to determine to disconnect from the network after a predetermined time elapses from the time a text message is transmitted, such as for example, 5 minutes after a text message is transmitted. In another example, the processor may identify the communication parameter as an e-mail, and the user input instruction may instruct the processor to determine to disconnect from the network after a predetermined time elapses from the time an e-mail is transmitted, such as for example, 10 minutes after an e-mail is transmitted. The predetermined times may be the same or different for separate types of communication. The predetermined times may be from pre-set instructions and user instructions.

If the processor detects that an instruction is received at a user interface of the electronic device at block 302, the processor determines when to disconnect from the network based on the instruction received at the user interface, at block 304. The processor then disconnects the electronic device from the network based on the determination, at block 214.

If the processor detects that an instruction is not received at a user interface of the electronic device at block 302, the processor determines whether there is a preset instruction to disconnect from the network when an amount of time has elapsed from the time when the at least one communication was transmitted to the network, at block 306. The instruction may be stored at the electronic device or stored remotely at block 200, and received by the processor of the electronic device at block 202. If the processor detects an instruction to disconnect from the network when an amount of time has elapsed from the time when the at least one communication was transmitted to the network, the processor determines when to disconnect based on the preset instruction at block 307 and disconnects the electronic device from the network based on the determination, at block 214.

If the processor does not detect an instruction to disconnect from the network when an amount of time has elapsed from the time when the at least one communication was transmitted to the network, the processor may then determine when to disconnect from the network based on communication parameters identified by the processor, shown as alternative blocks 308, 310, 312 and 314. For example, if the processor identifies the at least one communication parameter as a type of communication, such as a voice transmission, a text message, a multi-media message or an e-mail, the processor may then determine when to disconnect from the network based on the type of communication, at block 308.

If the processor identifies the at least one communication parameter as an alphanumeric communication parameter, the processor may then determine when to disconnect from the network based on the least one alphanumeric character, at block 310. The alphanumeric communication parameter may include at least one alphanumeric character, a combination of alphanumeric characters, a number of occurrences of the alphanumeric character included in the at least one communication or the number of occurrences of the combination of alphanumeric characters included in the at least one communication. For example, a user may want to stay connected longer if they are more certain to receive a return communication in response to the transmitted communication. The transmitted communication may include a word, such as "doctor," when the user is expecting a return communication back from a doctor within a predetermined amount of time, such as 10 minutes. Accordingly, the user may instruct the processor to stay connected for 10 minutes after a communication, which includes the word doctor, is transmitted.

If the processor identifies the at least one communication parameter as a destination of the at least one communication, the processor may then determine when to disconnect from the network based on the destination of the at least one communication, shown at block 312. For example, a processor may determine when to disconnect from the network based on an e-mail address, a phone number, a physical address in a network, an internet protocol address, and a website or web address. A processor may also determine when to disconnect from the network based on multiple or different destinations of the at least one communication. For example, a user may want to stay connected for 20 minutes after a communication is sent to at least one of a spouse's work e-mail address and a spouse's personal e-mail address. Accordingly, the user may instruct the processor to stay connected for 20 minutes after the communication is sent to at least one of a spouse's work e-mail address and a spouse's personal e-mail address. A user may want to stay connected for 10 minutes after a communication is sent to a doctor's phone number. Accordingly, the user may instruct the processor to stay connected for 10 minutes after a communication is sent to the doctor's phone number.

A user of an electronic device may want to determine when to disconnect from the network based on the frequency of communications made to a person or entity. Accordingly, if a second communication is transmitted to the network, shown in phantom at block 212, the processor may determine when to disconnect from the network based on an amount of time between the time the first communication was sent to the destination and the time the second communication was sent to the destination, at block 314. For example, a user may want to stay connected for 10 minutes after two communications were sent to a spouse (i.e. a spouse's e-mail address or phone number) within the last hour. A user may want to stay connected for a longer period of time, such as 20 minutes, after more than two communications were sent to the spouse within the last hour. Accordingly, the user may instruct the processor to stay connected for 10 minutes or 20 minutes, respectively.

A processor may determine when to disconnect from the network based on any combination of communication parameters. Accordingly, a processor may determine when to disconnect from the network based on a combination of any of blocks 308, 310, 312 and 314. The processor may determine when to disconnect based on a hierarchy of communication parameters. For example, the processor may receive multiple instructions for a single communication, such as (1) an instruction to disconnect from the network after a predetermined time elapses based on a communication type (i.e. 10 minutes after an e-mail is transmitted) and (2) an instruction to disconnect from the network based on a destination of the communication (i.e. 20 minutes after the communication is sent to a spouse's e-mail address). The processor may then determine to disconnect from the network after 20 minutes based on the destination parameter. The processor may also determine to disconnect from the network after 10 minutes based on the communication type parameter. The processor may further determine to disconnect from the network after 15 minutes based on the average time of the two instructions. It is also contemplated that other algorithms may be used to determine when to disconnect based on multiple instructions, such as the summing the predetermined times of the multiple instructions.

A processor may determine when to disconnect from the network based on communication parameters other than the communication parameters described at blocks 308, 310, 312 and 314, such as a time of day a communication was transmitted, the geographical location (i.e. at work, at home, in a certain city, state or country) of the electronic device at the time the communication was transmitted using a location identifier, such as GPS system, or other communication parameters which may cause a user to want to remain connected to a network. After the processor determines when to disconnect from the network based on the at least one communication parameter, the processor disconnects the electronic device from the network based on the determination, at block 214, unless there is some other intervening event, such as another transmitted or received communication or an additional instruction to the processor to determine when to disconnect.

Figure 4:
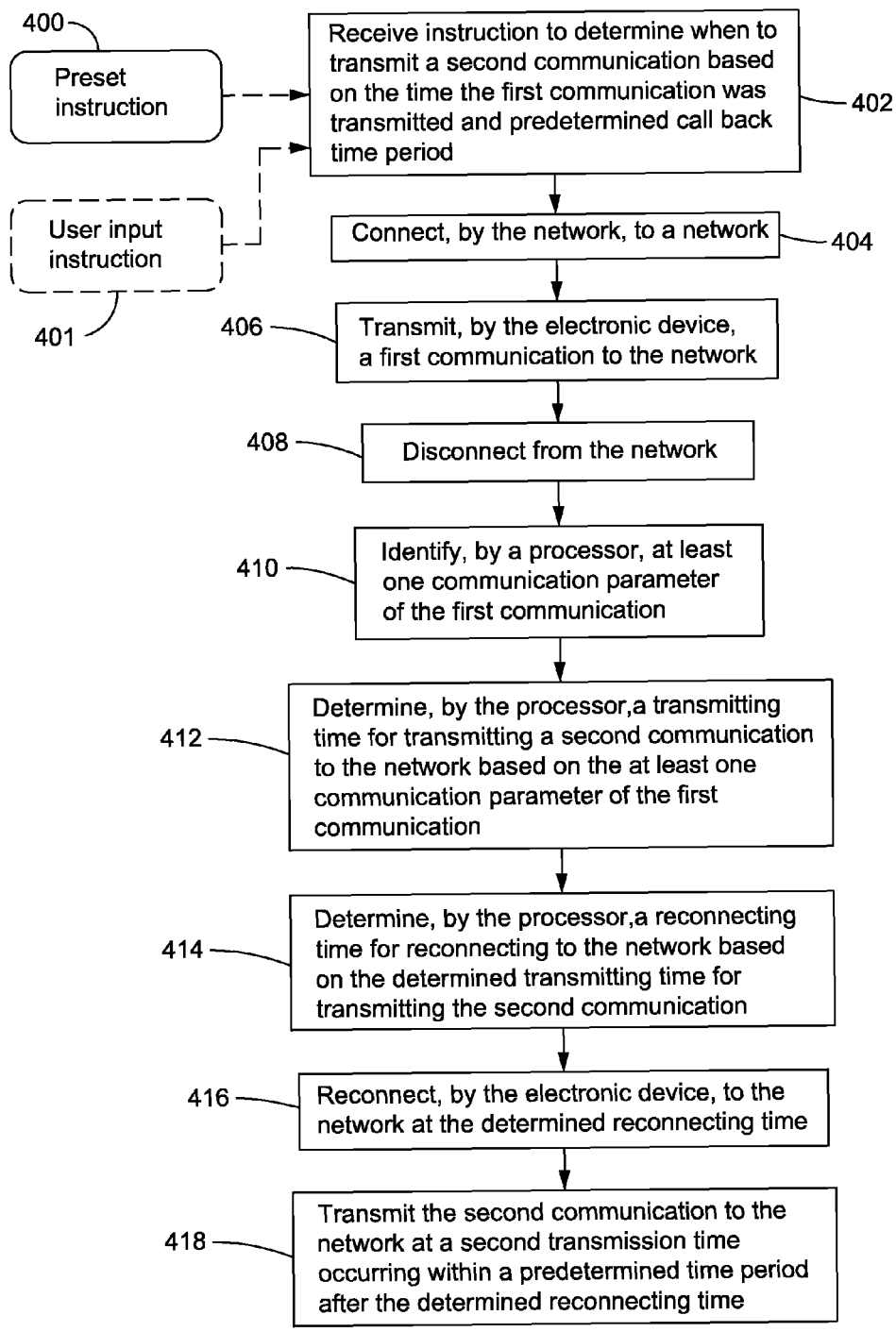
FIGS. 4 and 5 are flowcharts illustrating processes for determining when to transmit a communication to a network and when to connect to a network.

Power may also be conserved in an electronic device, while minimizing delays to the exchanging of data between electronic devices by determining when to transmit a second communication to a network after a first communication has been transmitted and when to reconnect to a network to transmit the second communication. FIG. 4 is a flowchart illustrating blocks of a method of determining when to transmit a communication to a network and when to reconnect to a network. The method may include connecting, by an electronic device, to a network, at block 404 and transmitting, by the electronic device, a first communication to the network, at block 406. The processor may then disconnect the electronic device from the network to conserve power, at block 408. A processor may disconnect the electronic device from the network by for example, terminating power to (turning off) a wireless radio, a wireless adapter, an internal router, an antenna or any other component that receives power in the electronic device during connection to a network.

The processor of the electronic device may then identify at least one communication parameter of the first communication transmitted to the network, at block 410. Examples of communication parameters identified by the processor may include the same parameters described above with reference to FIG. 2 and FIG. 3.

Figure 5:
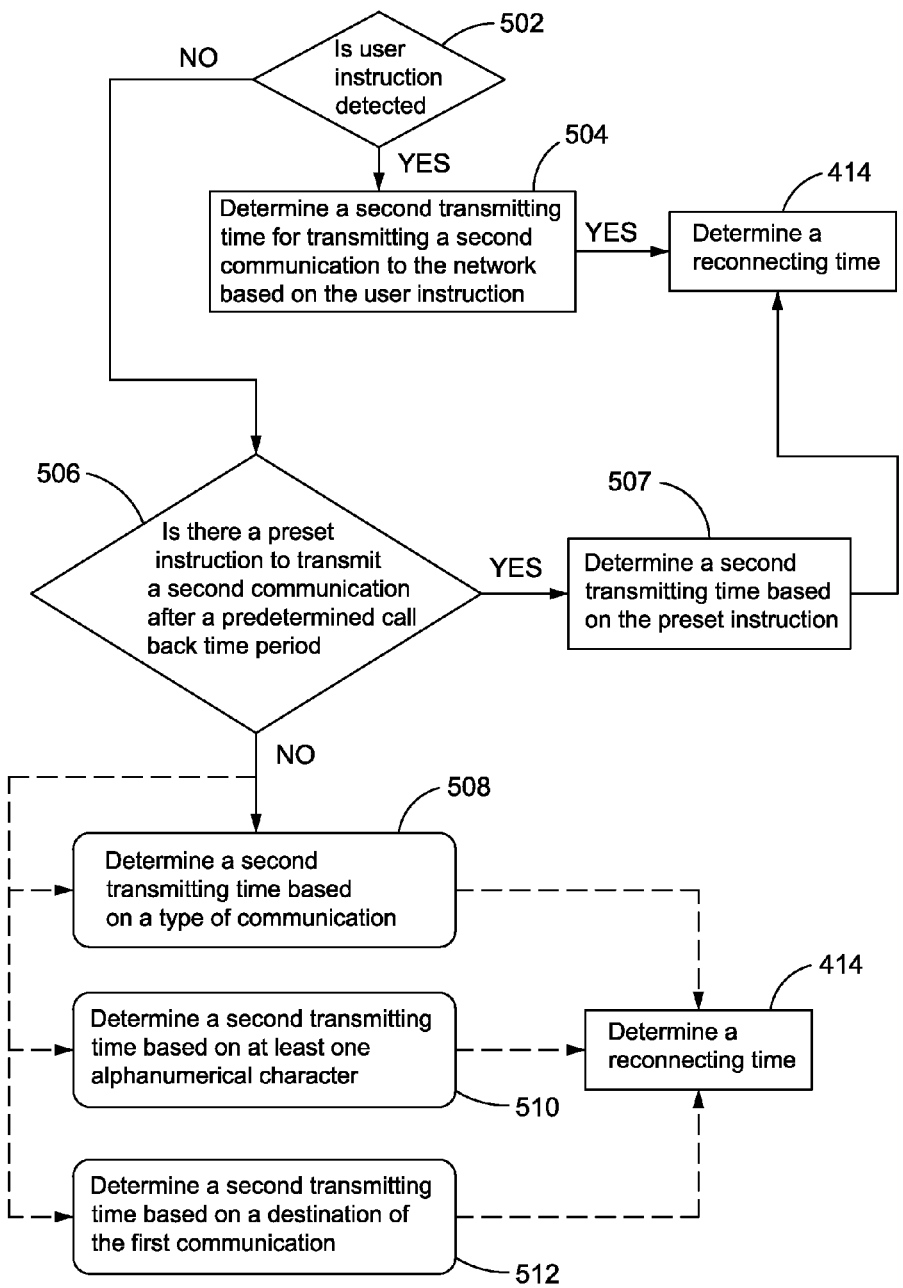

When a parameter is identified by the processor of the electronic device, the processor of the electronic device may then determine a second transmitting time for transmitting a second communication to the network based on at least one communication parameter identified by the processor, at block 412. Blocks 414, 416 and 418 are described below following the description of the determination made by the processor at block 412. FIG. 5 is a flowchart illustrating, in more detail, determining the second transmitting time for transmitting a second communication to the network shown at block 412 at FIG. 4.

At block 502, the processor detects whether an instruction is received at a user interface of the electronic device. A user input instruction may be received by the electronic device, shown in phantom at block 401. User input instructions may include instructions based on parameters described above at FIG. 2 and FIG. 3.

A user input instruction may also include determining when to transmit a second communication based on the time when the first communication was transmitted to the network and a predetermined call back time period, at block 402. The predetermined call back time period corresponds to a predetermined period of time that elapses from the time when the first communication was transmitted to the network. For example, the processor may receive a user input instructing the processor to transmit a second communication when a predetermined period of time (i.e. 20 minutes) has elapsed from the time when the first communication was transmitted to the network.

If the processor detects that an instruction is received at a user interface of the electronic device at block 502, the processor determines a second transmitting time based on the instruction received at the user interface, at block 504. The processor then determines a reconnecting time for reconnecting to the network based on the determined second transmitting time, at block 414.

If the processor detects that an instruction is not received at a user interface of the electronic device at block 502, the processor determines whether there is an instruction to transmit a second communication based on the time when the first communication was transmitted to the network and a predetermined call back time period, at block 506. The instruction may be stored at the electronic device or stored remotely at block 400, and received by the processor of the electronic device at block 402. If the processor detects an instruction to transmit a second communication based on the time when the first communication was transmitted to the network and a predetermined call back time period, the processor determines a second transmitting time based on the preset instruction at block 507 and determines a reconnecting time for reconnecting to the network based on the determined second transmitting time, at block 414. For example, if the predetermined call back time period is 20 minutes, and the first communication was transmitted at 12:00, then the processor determines to transmit the second communication at 12:20. Further, the processor may determine to reconnect to the network at 12:20 to transmit the second communication. The processor may also determine to reconnect to the network prior to the second transmitting time if the processor receives a preset instruction or an instruction by a user to connect prior to the second transmission time.

If the processor determines there is no instruction to transmit a second communication based on the time when the first communication was transmitted to the network and a predetermined call back time period, the processor may then determine when to transmit a second communication based on communication parameters identified by the processor, shown as alternative blocks 508, 510, and 512. That is, the processor may receive a preset instruction to determine when to transmit the second communication based on a communication parameter identified by the processor. At block 508, if the processor identifies the at least one communication parameter of the first communication as a type of communication, such as a voice transmission, a text message, a multimedia message or an e-mail, the processor may then determine to transmit a second communication based on the type of first communication. For example, if the first communication is an e-mail, the processor may then determine to transmit a second communication 20 minutes after the e-mail was transmitted. If the first communication is a text, the processor may then determine to transmit a second communication 10 minutes after the text was transmitted. The determined time to transmit a second communication be the same or different for separate types of communication.

If the processor identifies the at least one communication parameter as an alphanumeric communication parameter, the processor may then determine when to transmit a second communication based on the least one alphanumeric character, at block 510. The alphanumeric communication parameter may include at least one alphanumeric character, a combination of alphanumeric characters, a number of occurrences of the alphanumeric character included in the first communication or the number of occurrences of the combination of alphanumeric characters included in the first communication. For example, the first communication may include a word, such as "doctor." Accordingly, it may be desirable to transmit a second communication within a predetermined amount of time, such as 10 minutes, for a communication that includes a certain word, such as "doctor." Accordingly, the processor may determine to transmit a second communication 10 minutes after the first communication.

If the processor identifies the at least one communication parameter as a destination of the first communication, the processor may then determine when to disconnect from the network based on the destination of the first communication, shown at block 512. For example, a processor may determine when to transmit a second communication based on an e-mail address, a phone number, a physical address in a network, an internet protocol address, and a website or web address. A processor may also determine when to transmit a second communication based on multiple or different destinations of the first communication. For example, a user may want to transmit a second communication 20 minutes after a first communication is sent to at least one of a spouse's work e-mail address and a spouse's personal e-mail address.

Accordingly, the processor may determine to transmit a second communication to the spouse's work e-mail address and a spouse's personal e-mail address 20 minutes after the first communication was sent.

A processor may also determine when to transmit a second communication based on any combination of communication parameters, such as a time of day a first communication was transmitted, the geographical location (i.e. at work, at home, in a certain city, state or country) of the electronic device at the time the first communication was transmitted using a location identifier, such as GPS system, or other communication parameters which may cause a user to want to transmit as second communication. Accordingly, a processor may determine when to transmit a second communication based on a combination of any of blocks 508, 510, and 512. A processor may determine when to transmit a second communication based on communication parameters other than the communication parameters described at blocks 508, 510, and 512. After the processor determines when to transmit a second communication based on the at least one communication parameter, the processor determines a reconnecting time for reconnecting to the network based on the determined second transmitting time, at block 414.

A processor may determine to reconnect an electronic device prior to or simultaneous with the determined second transmitting time. Further, a processor may determine the second transmission time to occur within a predetermined allowance time period from the determined reconnecting time. For example, a processor may determine to reconnect the electronic device prior to the determined second transmitting time to allow a user to check for missed communications. A processor may determine any allowance time period for any reason. The allowance time period may be set by the user. A processor may also determine the allowance time period to be zero, to reconnect the electronic device simultaneous with the determined second transmitting time.

The processor may then reconnect the electronic device to the network at the determined reconnecting time, shown at block 416. The second communication is transmitted to the network at the determined second transmission time, occurring within the predetermined allowance time period from the determined reconnecting time at block 418.

Figure 6:
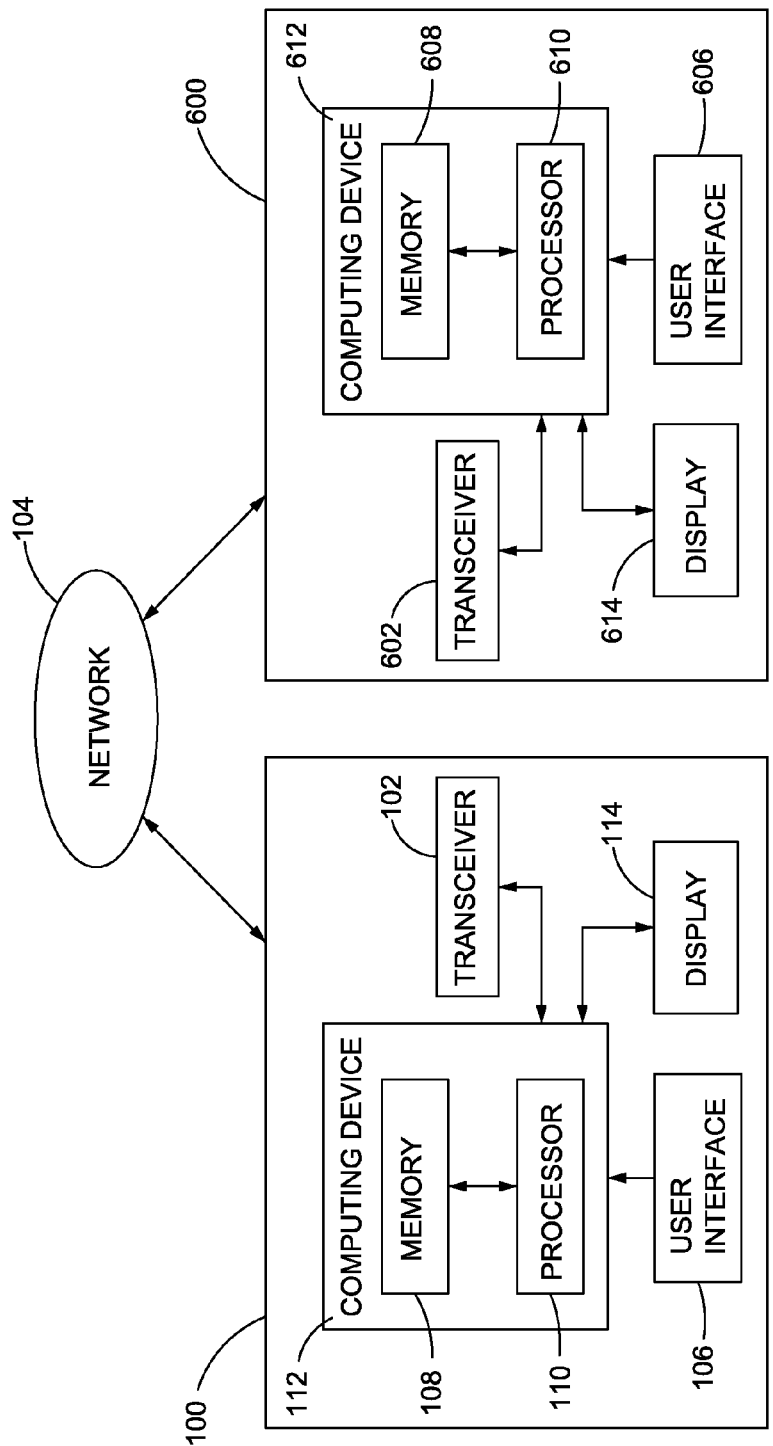
FIG. 6 illustrates a system including multiple electronic devices.

FIG. 6 illustrates a system having multiple electronic devices. Referring to FIG. 6, the system includes the first electronic device 100, having the same components described above at FIG. 1. The system also includes a second electronic device 600, having the same components as electronic device 100. Electronic devices may, however, include different components as those shown at FIG. 6.

Exemplary electronic device 600 includes a user interface 606 configured to receive user instructions from a user of the electronic device 600 and a display 614 configured to display information to the user. The user interface 606 may include a touch-sensitive input component that is integrated with the display, such as a capacitive, resistive or other type of touch screen. Alternatively, the touch-sensitive component may be an item of hardware that is separate from the display, touch as a touch pad or trackpad, such as a keyboard and a mouse. Electronic device 600 may also receive inputs from other devices, such as a camera and a microphone.

The electronic device 600 also includes a transceiver 602, having a transmitter configured to transmit at least one communication to a network 104 and a receiver configure to receive at least one communication from the network. The electronic device 600 also includes a computing device 612 having a processor 610, a tangible, computer-readable memory 608, and program instructions that implement a method of determining when to disconnect from the network 104. In some embodiments, memory 608 is configured to store at least one of the user instructions and preset instructions. Processor 610 may also receive instructions directly by the user interface 606. In other embodiments, instructions may be stored in a remote storage location such as a networked server or a cloud storage device. If the items are stored remotely, the device may retrieve them from the remote storage location via one or more communication ports.

Power may also be conserved in multiple electronic devices, while minimizing delays to the exchanging of data between the electronic devices, by implementing a predetermined call back time period in each of the electronic devices. Accordingly, determining a second transmission time and determining connection times may be done without the first electronic device 100 being in direct data communication with the second electronic device 600.

Figure 7:
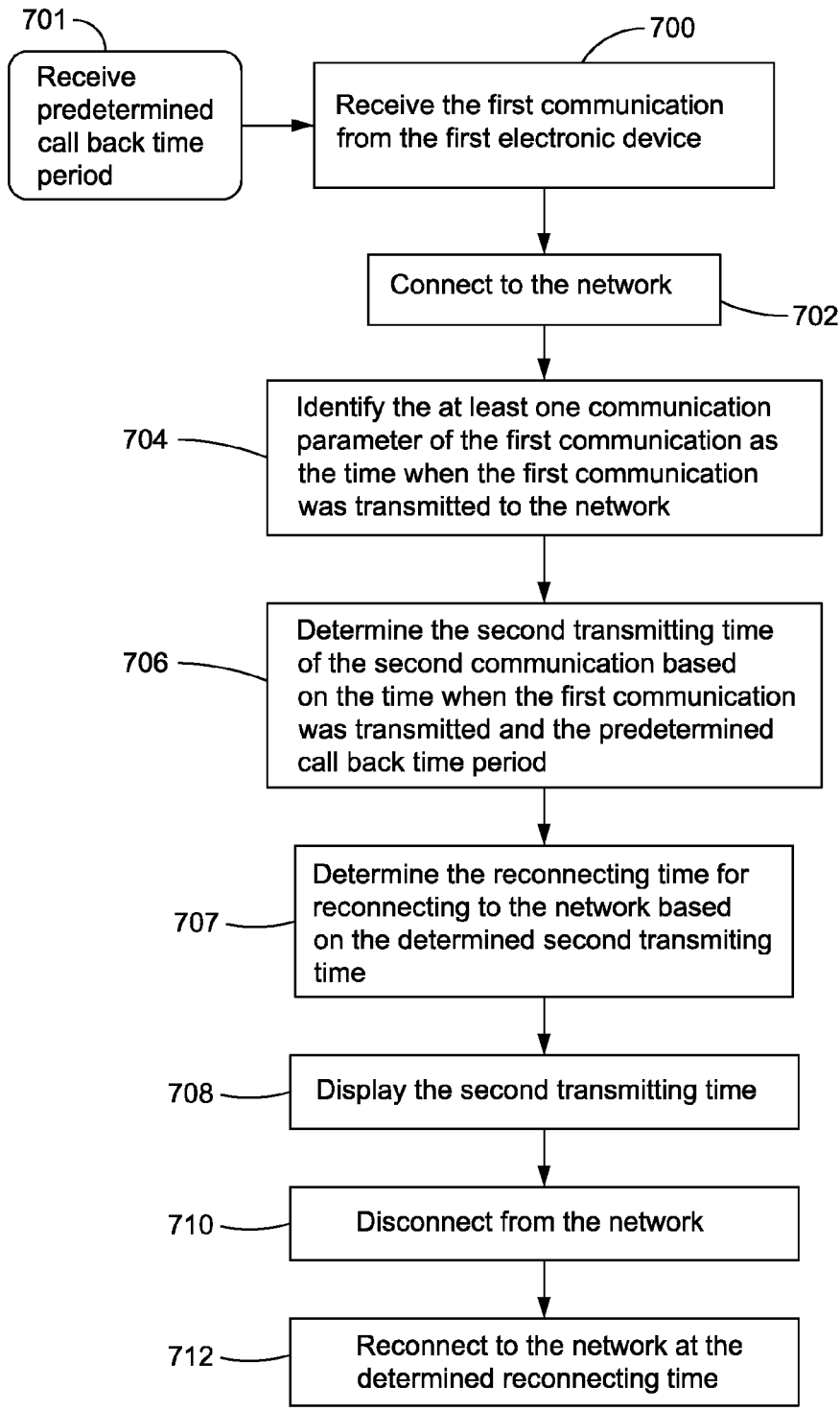
FIG. 7 is a flowchart illustrating a process of a second electronic device for determining a connection time to a network for receiving a communication from a first electronic device.

FIG. 7 is a flowchart illustrating blocks of a method of a second electronic device 600 determining a connection time to a network for receiving the second communication transmitted by the first electronic device 100. The determination of when to connect to the network by the second electronic device 600 is based on the predetermined call back time period used by the first electronic device 100 described at block 506 of FIG. 5. The predetermined call back time period may be stored, for example, at memory 108 of electronic device 100 and memory 608 of electronic device 600. The predetermined call back time period may also be transmitted to each electronic device remotely. A network operator may also inform a user of a predetermined call back time period and a user may then instruct a processor to connect to a network at the expected call back time.

The method will be described with reference to FIG. 7 and with reference to some blocks of the method illustrated at FIG. 4 and FIG. 5. Referring to FIG. 4, electronic device 100 receives an instruction to determine when to transmit a second communication based on the time when the first communication was transmitted to the network and a predetermined call back time period, at block 402. After a first communication is transmitted to the network, at block 406, the processor may then disconnect the electronic device from the network to conserve power, at block 408. Further, as described above at FIG. 3 and FIG. 4, electronic device 100 may determine to transmit a second communication based on the time when the first communication was transmitted to the network and a predetermined call back time period. For example, if the predetermined call back time period is 20 minutes, and the first communication was transmitted at 12:00, then the processor determines to transmit the second communication at 12:20. Further, the processor may determine to reconnect to the network at 12:20 to transmit the second communication.

Referring to FIG. 7, second electronic device 600 receives the first communication from first electronic device 100 at block 700. Because the first communication was transmitted while second electronic device 600 was disconnected from the network, however, the second electronic device 600 does not receive the first communication until second electronic device 600 connects to the network sometime after the first communication was transmitted. Second electronic device 600 may receive the first communication as a missed call notification.

Electronic device 600 then connects to the network at block 702 and identifies the at least one communication parameter of the first communication as the time when the first communication was transmitted to the network, at block 704. For example, second electronic device 600 connects to the network at 12:10 and identifies a missed call transmitted from electronic device 100 at 12:00.

Processor 610 of electronic device 600 then determines the second transmitting time of the second communication based on the time when the first communication was transmitted and the predetermined call back time period, at block 706 and determines a reconnecting time for reconnecting to the network based on the determined second transmitting time at block 707. As described above, the predetermined call back time period may be stored or received at both electronic device 100 and electronic device 600. Accordingly, processor 610 of electronic device 600 receives the predetermined call back time period (used by processor 110 of electronic device 100) prior to determining the second transmitting time of the second communication, at block 701. For example, processor 610 determines that the second communication will be transmitted 10 minutes from the current time (12:10). The determination is based on the time when the first communication was transmitted (12:00) and the predetermined call back time period (20 minutes). Therefore, the processor determines the second communication will be at 12:20. At block 708, the second transmitting time is then displayed at display 614 of the electronic device 600, informing the user of the time to expect a call back from electronic device 100.

Electronic device 600 then disconnects from the network at block 710 to conserve power and reconnects to the network at the determined reconnecting time at block 712 to receive the second communication from electronic device 100 at the determined second transmission time. A processor may determine to reconnect an electronic device prior to or simultaneously with the determined second transmitting time. Further, a processor may determine the second transmission time to occur within a predetermined allowance time period from the determined reconnecting time. For example, a processor may determine to reconnect the electronic device prior to the determined second transmitting time to allow a user to check for missed communications. A processor may determine any allowance time period for any reason. The allowance time period may be set by the user. A processor may also determine the allowance time period to be zero and to reconnect the electronic device simultaneous with the determined second transmitting time.

Some or all of the above-disclosed and other features and functions, or alternatives thereof, may be desirably combined into many other different systems or applications. Various presently unforeseen or unanticipated alternatives, modifications, variations or improvements therein may be subsequently made by those skilled in the art, each of which are also intended to be encompassed by the disclosed embodiments.

The invention claimed is:

1. A method of operating a mobile electronic device, comprising:
   connecting, by an electronic device, to a network;
   transmitting, by the electronic device, at least one communication to the network,
   identifying, by a processor of the electronic device, at least one communication parameter of the at least one communication;
   determining, by the processor of the electronic device, a first disconnect time as which to disconnect from the network based on the at least one communication parameter identified by the processor;
   disconnecting from the network at the first disconnect time;
   wherein:
   the at least one communication includes a first communication and a second communication;
   the identifying at least one communication parameter includes identifying;
      communication parameters of the first communication as:
         a time that the first communication was transmitted, and
         a destination of the first communication;
      communication parameters of the second communication as:
         a time that the second communication was transmitted, and
         the destination of the first communication; and
   the determining when to disconnect from the network is based on an amount of time between the time that the first communication was sent to the destination and the time that the second communication was sent to the destination.

2. The method of claim 1, further comprising:
   detecting, by the processor of the electronic device, an instruction received at a user interface of the electronic device, and
   wherein the determining, by the processor of the electronic device, when to disconnect from the network is based on the received instruction at the user interface.

3. The method of claim 1, wherein,
   identifying at least one communication parameter includes identifying a time when the at least one communication was transmitted to the network, and
   the method further comprises: receiving an instruction to disconnect from the network when an amount of time has elapsed from the time when the at least one communication was transmitted to the network, and
   wherein determining when to disconnect from the network includes determining when to disconnect from the network based on the amount of time that has elapsed from the time when the at least one communication was transmitted to the network.

4. The method of claim 1, wherein,
   identifying at least one communication parameter includes identifying a type of communication; and
   determining when to disconnect from the network includes determining when to disconnect from the network based on the type of communication.

5. The method of claim 4, wherein the type of communication is selected from a group of communication types consisting of voice transmissions, text messages, multi-media messages and e-mails.

6. The method of claim 1, wherein,
   identifying at least one communication parameter includes identifying an alphanumeric communication parameter from a group of alphanumeric communication parameters which include at least one alphanumeric character, a combination of alphanumeric characters, a number of occurrences of the alphanumeric character included in the at least one communication and the number of occurrences of the combination of alphanumeric characters included in the at least one communication; and
   determining when to disconnect from the network includes determining when to disconnect from the network based on the least one alphanumeric character of the at least one communication.

7. The method of claim 1, wherein,
   identifying at least one communication parameter includes identifying a destination of the at least one communication; and determining when to disconnect from the network includes determining when to disconnect from the network based on the destination of the at least one communication.

8. The method of claim 1, further comprising determining, by the processor, when to reconnect to the network after disconnecting from the network based on the at least one communication parameter of the at least one communication.

9. A method of operating a mobile electronic device, comprising:
 connecting, by an electronic device, to a network;
 transmitting, by the electronic device, a first communication to the network,
 identifying, by a processor of the electronic device, at least one communication parameter of the first communication;
 determining, by the processor of the electronic device, a second transmitting time for transmitting a second communication to the network based on at least one communication parameter identified by the processor;
 disconnecting, by the electronic device, from the network;
 determining, by the processor of the electronic device, a reconnecting time for reconnecting to the network based on the second transmitting time determined by the processor of the electronic device;
 reconnecting, by the electronic device, to the network at the determined reconnecting time; and
 transmitting the second communication to the network at the second transmission time, the second transmission time occurring within a predetermined allowance time period from the determined reconnecting time.

10. The method of claim 9, further comprising:
 detecting, by the processor of the electronic device, an instruction received at a user interface of the electronic device, and
 wherein the determining, by the processor of the electronic device, a second transmitting time for transmitting a second communication to the network includes determining a second transmission time based on the received instruction at the user interface.

11. The method of claim 9, wherein,
 the identifying at least one communication parameter includes identifying the at least one communication parameter as a time when the first communication was transmitted to the network; and
 the determining a second transmitting time for transmitting a second communication to the network includes determining a second transmitting time based on the time when the first communication was transmitted to the network and a predetermined call back time period, wherein the predetermined call back time period corresponds to a predetermined period of time that elapses from the time when the first communication was transmitted to the network.

12. The method of claim 11, the method further comprising:
 receiving, by the other electronic device, the first communication from the electronic device;
 connecting, by another electronic device, to the network
 identifying the at least one communication parameter of the first communication as the time when the first communication was transmitted to the network;
 determining, by a processor of the other electronic device, the second transmitting time of the second communication based on the time when the first communication was transmitted and the predetermined call back time period;
 determining, by the processor of the other electronic device, a reconnecting time for reconnecting to the network based on the second transmitting time determined by the processor of the other electronic device;
 displaying, at a display of the other electronic device, the second transmitting time;
 disconnecting, by the other electronic device, from the network; and
 reconnecting, by the other electronic device, to the network at the determined reconnecting time.

13. The method of claim 12, further comprising:
 storing, at the electronic device and the other electronic device, the predetermined call back time period;
 wherein the determining the second transmitting time by the processor of the electronic device includes determining the second transmitting time based on the time when the first communication was transmitted to the network and the stored predetermined call back time period; and
 the determining the second transmitting time by the processor of the other electronic device include determining the second transmitting time based on the time when the first communication was transmitted to the network and the stored predetermined call back time period.

14. A mobile electronic device operation system, comprising:
 an electronic device including:
  a transmitter configured to transmit at least one communication to a network;
  a user interface configured to receive user instructions from a user of the electronic device;
  a computing device having a processor and a memory, wherein the memory has at least one of the user instructions and preset instructions that instruct the processor to:
   identify at least one communication parameter of the at least one communication;
   determine when to disconnect from the network based on the at least one communication parameter identified by the processor;
   disconnect the electronic device from the network based on the determination by the processor;
   identify the at least one communication parameter as a time when a first communication of the at least one communication was transmitted to the network;
   determine a second transmitting time for transmitting a second communication of the at least one communications to the network based on the time when the first communication was transmitted to the network and a predetermined call back time period, wherein the predetermined call back time period corresponds to a predetermined period of time that elapses from the time when the first communication was transmitted to the network;
   determine a reconnecting time for reconnecting to the network based on the second transmitting time determined by the processor of the electronic device;
   reconnect the electronic device to the network at the determined reconnecting time; and
   transmit the second communication to the network at the second transmission time, the second transmission time occurring within a predetermined allowance time period from the determined reconnecting time.

15. The system of claim 14, wherein the at least one of the user instructions and preset instructions further instruct the processor of the electronic device to:

identify the at least one communication parameter as a time when the at least one communication was transmitted to the network; and disconnect from the network based on an amount of time that has elapsed from the time when the at least one communication was transmitted to the network.

16. The system of claim 14, wherein the at least one of the user instructions and preset instructions further instruct the processor of the electronic device to reconnect to the network after disconnecting from the network based on the at least one communication parameter of the at least one communication.

17. The system of claim 14, further comprising:

another electronic device including: a receiver configured to receive at least one communication from the network; a user interface configured to receive user instructions from a user of the other electronic device; a display configured to display messages to the user of the other electronic device; a computing device having a processor and a memory, wherein the memory has at least one of the user instructions from the user of the other electronic device and preset instructions that instruct the processor of the other electronic device to: identify the at least one communication parameter of the first communication received from the electronic device as the time when the first communication was transmitted to the network by the electronic device; determine the second transmitting time of the second communication based on the time when the first communication was transmitted to the network and the predetermined call back time period; cause the display to display a message to the user of the other electronic device indicating the second transmitting time; disconnect the other electronic device from the network; and reconnect the other electronic device to the network at the second transmitting time.

18. The system of claim 17, wherein, the predetermined call back time period is stored at the memory of the electronic device and the memory of the other electronic device;

the at least one of the user instructions and preset instructions further instruct the processor of the electronic device to determine the second transmitting time based on the time when the first communication was transmitted to the network and the predetermined call back time period stored at the electronic device; and the at least one of the user instructions and preset instructions further instruct the processor of the other electronic device to determine the second transmitting time based on the time when the first communication was transmitted to the network and the predetermined call back time period stored at the other electronic device.

* * * * *